United States Patent [19]

Ray

[11] Patent Number: 5,543,204
[45] Date of Patent: Aug. 6, 1996

[54] BI-DIRECTIONALLY CORRUGATED SANDWICH CONSTRUCTION

[75] Inventor: Hemen Ray, Perkasie, Pa.

[73] Assignee: The United States of America as represented by the Secretary of the Navy, Washington, D.C.

[21] Appl. No.: 368,949

[22] Filed: Jan. 5, 1995

[51] Int. Cl.⁶ .............................. B32B 1/00; B05C 3/107; B31F 1/22
[52] U.S. Cl. ......................... 428/179; 428/178; 428/182; 428/184; 428/225; 428/226; 428/245; 156/205; 156/206; 264/241; 264/286; 264/505; 52/783.11; 52/783.18; 52/793.11
[58] Field of Search ..................... 428/178, 179, 428/182, 184, 105, 107, 108, 225, 226, 245; 52/795, 799, 800, 807; 156/205, 206; 264/241, 286, 257, 505

[56] References Cited

U.S. PATENT DOCUMENTS

| | | | |
|---|---|---|---|
| 5,128,195 | 7/1992 | Hegedus | 428/174 |
| 5,162,143 | 11/1992 | Porter | 428/179 |
| 5,348,601 | 9/1994 | Ray | 156/155 |
| 5,393,588 | 2/1995 | Weddendorf | 428/175 |

*Primary Examiner*—Donald J. Loney
*Attorney, Agent, or Firm*—Susan E. Verona

[57] ABSTRACT

A bi-directionally corrugated sandwich construction for use in applications requiring high-strength, light-weight components is disclosed. The sandwich construction comprises first and second face sheets positioned essentially parallel to and spaced apart from each other and having a core therebetween. The core has two sets of corrugated strips which have planar peaks and troughs positioned at regular intervals. The strips of the first set are positioned parallel to and spaced apart from each other with the peaks and the troughs in phase with each other such that parallel rows of troughs are formed perpendicular to the strips. The strips of the second set are positioned parallel to each other with the peaks and troughs in phase with each other, and are positioned perpendicular to the first set of strips in the rows of troughs formed thereby. The sandwich construction is made by forming a first piece comprising one face sheet and the first set of strips, forming a second piece comprising the other face sheet and the second set of strips, and then fixing the two pieces to each other so that the strips of the second set fit into the rows formed by the strips of the first set.

14 Claims, 2 Drawing Sheets

BI-DIRECTIONALLY CORRUGATED SANDWICH CONSTRUCTION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to sandwich constructions for use in structural and non-structural members, and more particularly to corrugated sandwich constructions for use in applications requiring high-strength, light-weight components.

Sandwich constructions are finding broad application as structural and non-structural members in boats, aircraft, furniture, refrigerators, and other items requiring high strength, light-weight materials. In airplane design in particular the need for weight efficiency and aerodynamically smooth surfaces under high stress levels has stimulated use of such sandwich constructions. A typical sandwich construction includes face sheets bonded to either side of a low-density core. The honeycomb core sandwich constructions are considered to be among the most weight-efficient, but they have a tendency to retain moisture which may become entrapped due to ineffective edge seals, damage to the face sheets, or unbonding of the face sheets from the core. Retained moisture may degrade the construction's structural integrity and lead to extensive corrosion and premature failure. Another type of sandwich construction incorporates corrugated sheet as its core. This construction suffers from a similar moisture retention problem, in that moisture can only escape in a direction parallel to the peaks and troughs of the corrugations.

In U.S. Pat. No. 5,348,601 issued to Hemen Ray on Sep. 20, 1994, there is disclosed a low-density sandwich construction with an open core that makes it self-venting. It comprises corrugated strips having planar peaks and troughs, arranged adjacent to and parallel with each other, with the peaks and troughs of adjacent strips being 180 degrees out of phase with each other. This creates a plurality of passage-ways through which moisture can escape. Such a construction has good bending strength in the direction perpendicular to the corrugated strips, but less bending strength in the transverse direction. The method of making such a construction requires the use of variously-shaped mandrels, and further requires the use of a two-step curing process because midway through the process the solid mandrels must be replaced with a granular material.

In U.S. Pat. No. 5,162,143 issued to Porter on Nov. 10, 1992, there is disclosed a sandwich construction having a core which is made up of a plurality of criss-crossed corrugated strips. The corrugated strips cross at their peaks and troughs. To manufacture the construction, forming protrusions are positioned on a base, and the corrugated strips are placed over the protrusions to form the peaks of the corrugations. One protrusion is required for each peak crossing point. The criss-crossed strips are then cured to form the core of the sandwich construction. The forming protrusions are then removed, and face sheets are adhesively bonded to the core. This construction thus does not overcome the face sheet unbonding problem from which sandwich constructions suffer.

Generally, designers of sandwich constructions seek to optimize lightness of weight, strength (including bending strength in more than one direction), ease of manufacture, and minimization of future maintenance problems caused by moisture retention and unbonding of the face sheets of the construction.

SUMMARY OF THE INVENTION

Accordingly, an object of the present invention is to provide a sandwich construction having a high strength-to-weight efficiency suitable for a broad variety of military, industrial and commercial applications.

Another object is to provide a sandwich construction in which corrosion and degradation of structural integrity due to retention of moisture is substantially eliminated.

Another object is to provide a sandwich construction in which the incidence of unbonding of the face sheets from the core during use or repair is substantially reduced.

A still further object is to provide a sandwich construction having a core with passageways which arrest cracks developed during use or upon impact.

Another object is to provide a sandwich construction of the type having corrugated strips which has bi-directional bending strength.

A further object is to provide a method of fabricating a bi-directionally corrugated sandwich construction.

These and other objects of the invention are accomplished by a bi-directionally corrugated sandwich construction comprising first and second face sheets positioned essentially parallel to and spaced apart from each other and having a core therebetween. The core has two sets of corrugated strips which have planar peaks and troughs positioned at regular intervals. The strips of the first set are positioned parallel to and spaced apart from each other with the peaks and the troughs in phase with each other such that parallel rows of troughs are formed perpendicular to the strips. The strips of the second set are positioned parallel to each other with the peaks and troughs in phase with each other, and are positioned perpendicular to the first set of strips in the rows of troughs formed thereby. The sandwich construction is made by forming a first piece comprising one face sheet and the first set of strips, forming a second piece comprising the other face sheet and the second set of strips, and then fixing the two pieces to each other so that the strips of the second set fit into the rows formed by the strips of the first set.

Other objects, advantages, and novel features of the invention will become apparent from the detailed description taken in conjunction with the accompanying drawings.

DESCRIPTION OF THE PREFERRED EMBODIMENT

Figure 1:
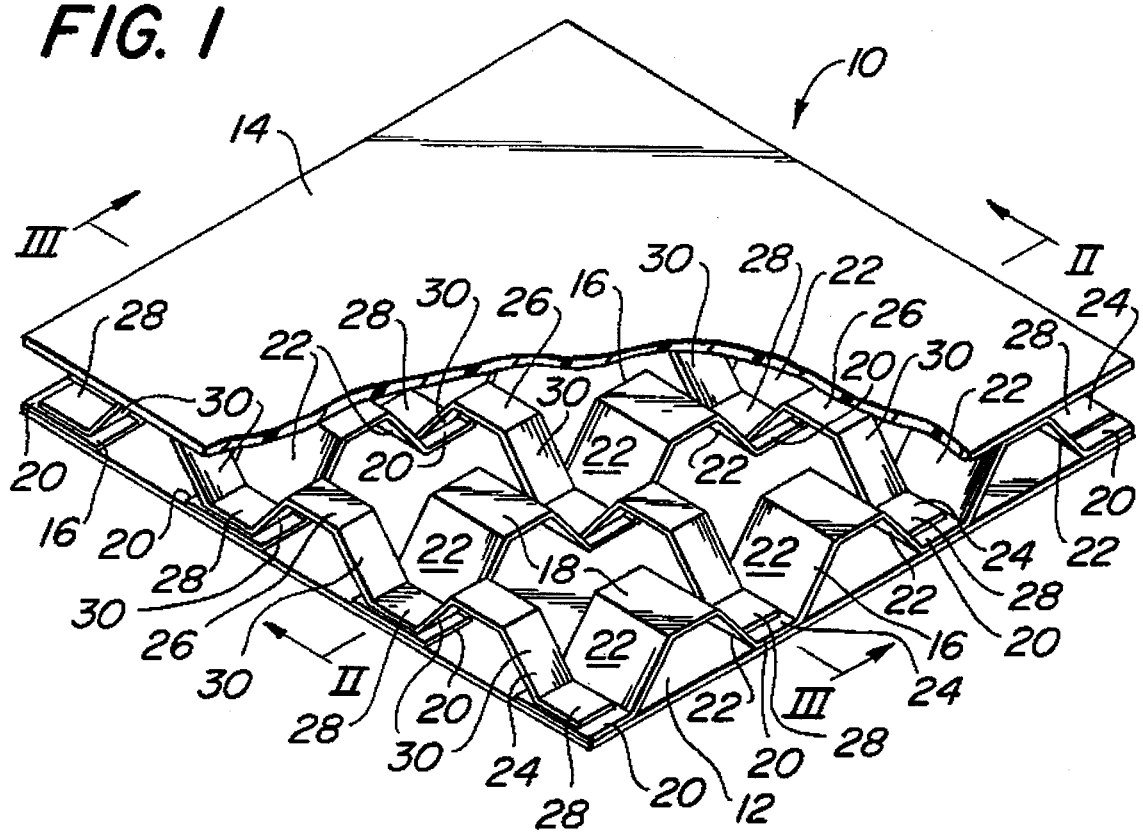
FIG. 1 is a partially cutaway, perspective view of a bi-directionally corrugated sandwich construction according to the present invention.

Referring now to the drawings, wherein like reference characters represent like or corresponding parts throughout the several views, one sees in FIG. 1 the bi-directionally corrugated sandwich construction 10 of the present invention. A first face sheet 12 and a second face sheet 14 are positioned essentially parallel to and spaced apart from each other. Fixed between face sheets 12 and 14 is a core comprising a first plurality of corrugated strips 16 having planar peaks 18 and planar troughs 20 positioned at regular intervals and connected by sloped risers 22. Strips 16 are positioned parallel to and spaced apart from each other with peaks 18 and troughs 20 being in phase with each other so that parallel rows of adjacent troughs are formed perpendicular to the direction of strips 16. The core also comprises a second plurality of corrugated strips 24 fixed between face sheets 12 and 14. Strips 24 have planar peaks 26 and planar troughs 28 positioned at regular intervals and connected by sloped risers 30, and are positioned parallel to each other with the peaks and troughs in phase with each other. Strips 24 are positioned perpendicular to strips 16, one of strips 24 being positioned in each of the rows of troughs 20 formed by strips 16. Strips 24 are fixed to troughs 20, so that strips 16 and 24 are fixed to each other at all of their respective troughs 20 and 28. The outer surfaces of troughs 20 of strips 16 are fixed directly to first face sheet 12, and the outer surfaces of troughs 28 of strips 24 are fixed to the inner surfaces of troughs 20 of strips 16. Troughs 20 and 28 are the only locations at which strips 16 and 24 are in contact. In other words, there is no overlap or crossing-over of strips 16 and 24 at peaks 18 and 26. Peaks 18 and 26 are all fixed to second face sheet 14 on the outer surfaces thereof.

Figure 2:
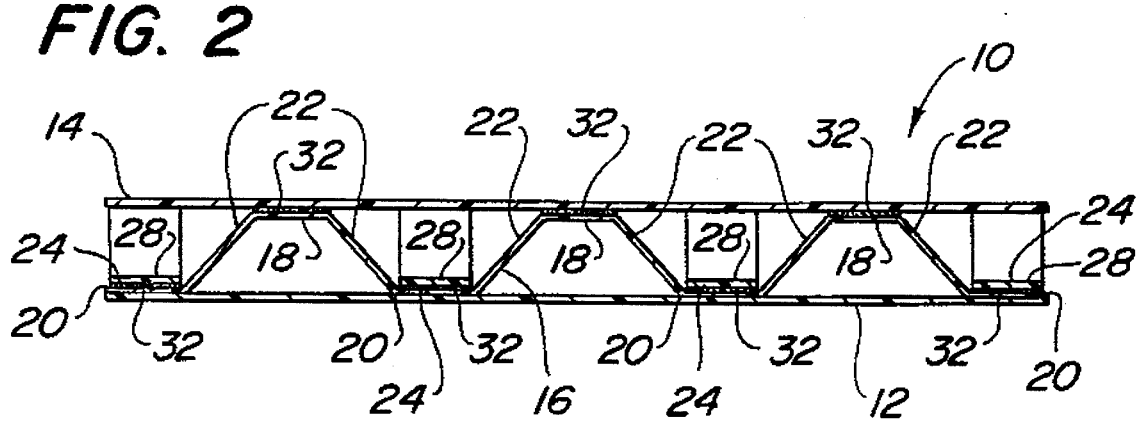
FIG. 2 is a cross-sectional view of the bi-directionally corrugated sandwich construction of FIG. 1, taken along lines II—II.
Figure 3:
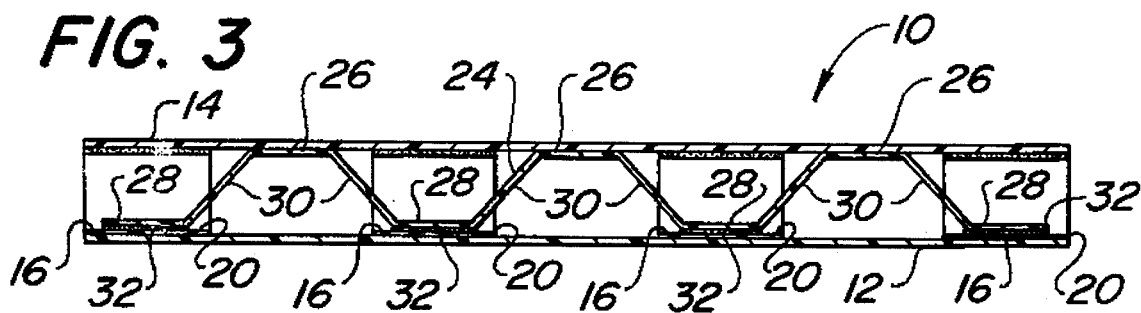
FIG. 3 is a cross-sectional view of the bi-directionally corrugated sandwich construction of FIG. 1, taken along lines III—III.
Figure 4:
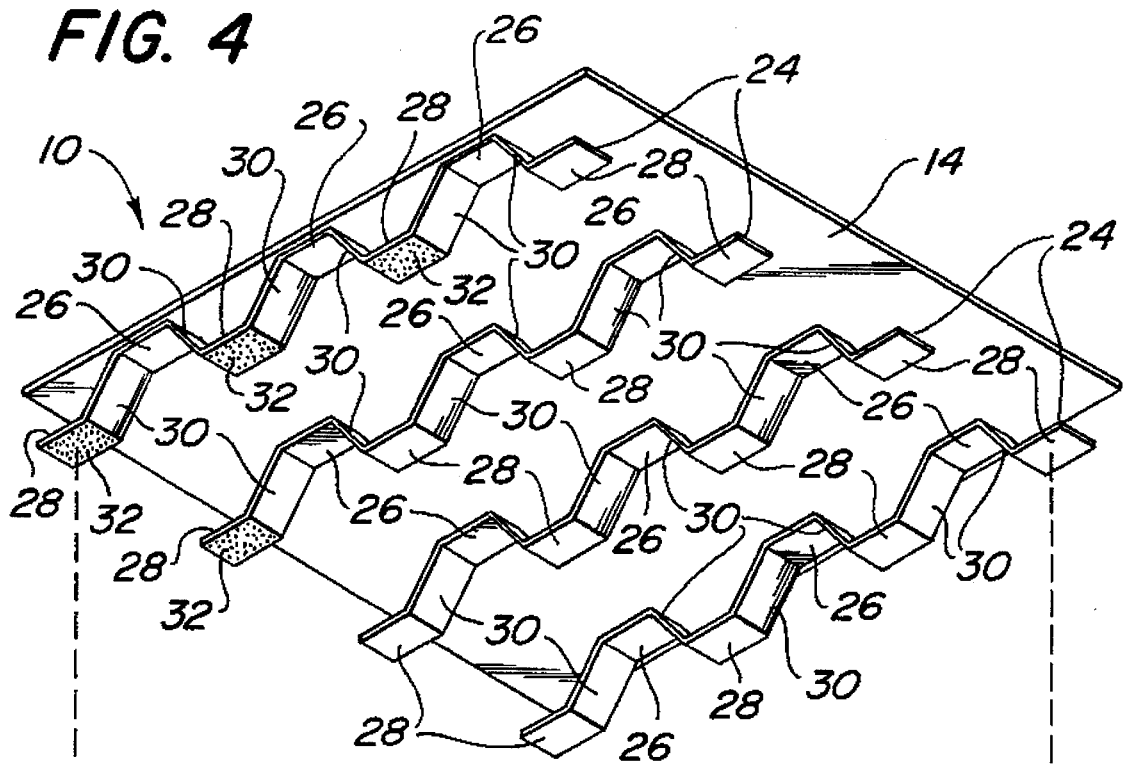
FIG. 4 is a perspective view of the bi-directionally corrugated sandwich construction of FIG. 1 showing how it is assembled according to the invention.
Figure 4:
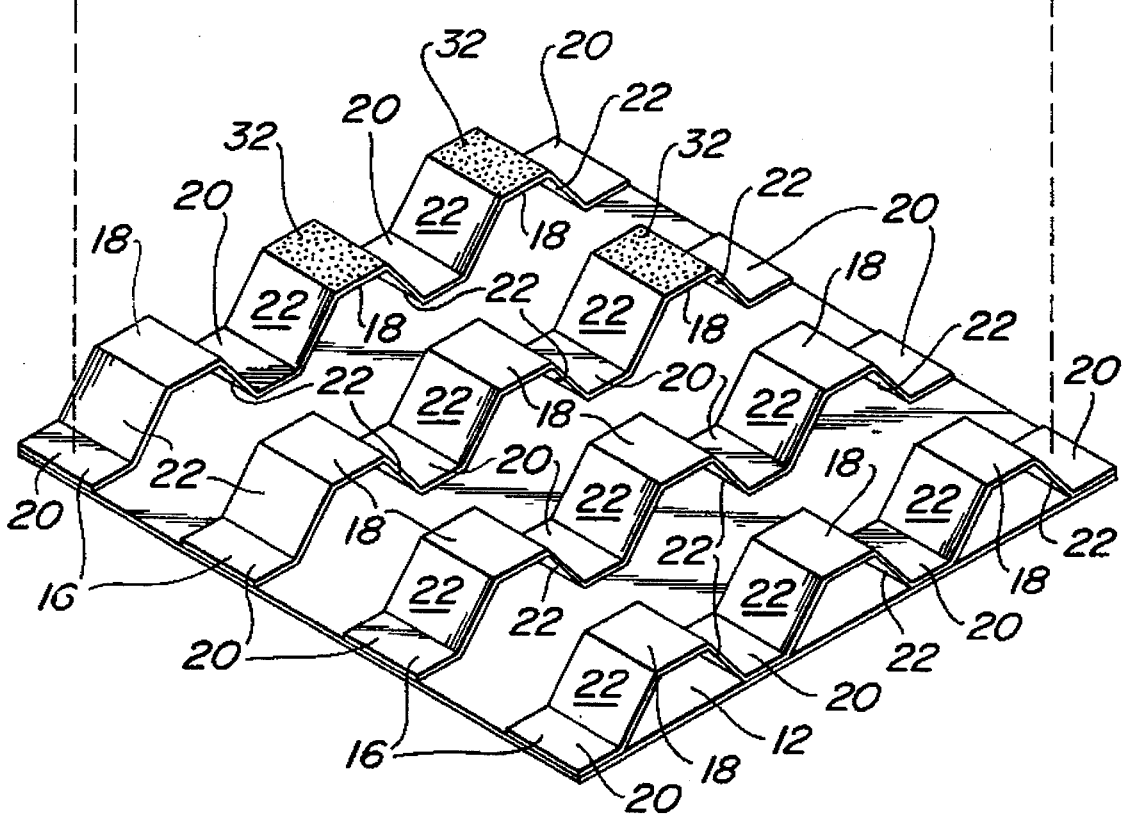

FIGS. 2 and 3 show that strips 16 form an integral connection with first face sheet 12, and are bonded, as by an adhesive 32, to second face sheet 14. On the other hand, strips 24 form an integral connection with second face sheet 14, and are bonded, as by adhesive 32 to strips 16 at troughs 20 of strips 16. The integral connections can be formed by a cocuring process. Preferably, face sheets 12 and 14 are made of a conventional heat-curable composite material, as are strips 16 and 24. For example, face sheets 12 and 14 and strips 16 and 24 can be composed of a fiber-reinforced, resin-impregnated composite.

Standard design considerations dictate the thickness and width of strips 16, the length and degree of slope of risers 22, and the lengths of planar peaks 18 and planar troughs 20. These parameters affect strength and weight in ways that are known to those skilled in the art. The spacing between strips 16 is likewise determined based on desired weight and strength. Many of the parameters of strips 24 are dictated by those of strips 16. The spacing between strips 24 must be the same as the distance between rows of troughs 20 formed by strips 16. Of course, the width of strips 24 must be narrow enough to allow strips 24 to fit into the rows of troughs 20 formed by strips 16, or, in other words, their width must be equal to or less than the length of troughs 20. Similarly, the length of troughs 28 will be equal to or less than the width of strips 16. The length and slope of risers 30 are established by the required spacing of troughs 28 as well as by the length and slope of risers 22, which establish the spacing between face sheets 12 and 14.

Bi-directionally corrugated sandwich construction 10 can be manufactured in the following manner. A first piece is formed from first face sheet 12 and the first plurality of corrugated strips 16. The first piece is formed by using first face sheet 12 as a base, and then placing long mandrels having an isosceles trapezoidal cross-section in parallel rows on the first face sheet. The mandrels are sized and shaped to create the desired dimensions, spacing, and slope of peaks 18, troughs 20, and risers 22 of strips 16. The mandrels are positioned so that they are in side-by-side abutment with each other, with the unequal sides of the mandrels inverted with respect to those of the next adjacent mandrels. Strips 16 are then wrapped around the mandrels in the transverse direction in parallel rows a predetermined distance apart from each other. Strips 16 are wrapped alternately over the mandrels that have their larger unequal sides on first face sheet 12 and then under the inverted mandrels, and so on across the entire length of the sandwich construction, to create rows of corrugated strips that are in-phase with respect to each other. Strips 16 and first face sheet 12 are then co-cured to form an integral bond between the two, after which the mandrels are removed. The mandrels may be made of a plastic-like material like TFE to facilitate their removal after curing.

A second piece is formed in the same manner, from second face sheet 14 and the second plurality of corrugated strips 24 of the necessary width and thickness. The mandrels used in making this second piece must be sized and shaped to give the peaks 26, troughs 28, and risers 30 of corrugated strips 24 the necessary dimensions to fit in the rows of troughs 20 of strips 16 when peaks 18 of strips 16 contact second face sheet 14. Additionally, strips 24 must be spaced apart from each other a distance equal to the distance apart of the rows of troughs 20 formed by strips 16.

The first and second pieces thus formed are then fixed to each other, such as by adhesive 32, so that the first and second face sheets 12 and 14 are parallel to each other, and so that corrugated strips 24 are positioned perpendicular to strips 16, one of strips 24 being positioned in each of the rows of troughs 20 formed by strips 16. Strips 24 are fixed by adhesive 32 to strips 16 on the insides of troughs 20 of strips 16. Second face sheet 14 is fixed by adhesive 32 to strips 16 at peaks 18 thereof.

Some of the many advantages of the invention should now be readily apparent.. For example, a sandwich construction having a high strength-to-weight efficiency and good bi-directional bending strength has been provided, in which passageways in the core provide a means for moisture to escape thereby eliminating corrosion, and arrest cracks developed during use or upon impact. Additionally, such a sandwich construction has been provided which has a reduced incidence of unbonding of the face sheets, due to integral connections between each of the sets of strips and their respective face sheets. A method of making a sandwich construction having all of these properties is provided which provides some integral bonding between the core and the face sheets, and is simpler than other methods of making sandwich constructions that have bi-directional strips.

The invention has been described with reference to particular preferred embodiments. It will be apparent to skilled artisans that various modifications can be made without departing from the spirit of the invention, and such modifications are intended to fall within the scope of the appended claims.

What is claimed is:

1. A bi-directionally corrugated sandwich construction, comprising:

first and second face sheets positioned essentially parallel to and spaced apart from each other;

a first plurality of corrugated strips fixed between said first and second face sheets, the corrugated strips of said first plurality having planar peaks and troughs positioned at regular intervals, and being positioned parallel to and spaced apart from each other with the peaks and the troughs being in phase with each other such that parallel rows of troughs are formed perpendicular to said first plurality of corrugated strips; and a second plurality of corrugated strips fixed between said first and second face sheets, the corrugated strips of said second plurality having planar peaks and troughs positioned at regular intervals, and being positioned parallel to each other with the peaks and troughs being in phase with each other, said second plurality of corrugated strips being positioned perpendicular to said first plurality of corrugated strips, the corrugated strips of said second plurality being positioned in the rows of troughs formed by said first plurality of corrugated strips.

2. The bi-directionally corrugated sandwich construction of claim 1, wherein the corrugated strips of said second plurality of strips are fixed to the troughs of the corrugated strips of said first plurality of strips.

3. The bi-directionally corrugated sandwich construction of claim 1, wherein there is an integral connection between said first face sheet and said first plurality of corrugated strips, and between said second face sheet and said second plurality of corrugated strips.

4. The bi-directionally corrugated sandwich construction of claim 1, wherein said first and second face sheets and said first and second pluralities of corrugated strips are composed of fiber-reinforced, resin-impregnated composite.

5. A method of making a bi-directionally corrugated sandwich construction, comprising the steps of:

forming a first piece having a first face sheet and a first plurality of corrugated strips fixed to the first face sheet, the corrugated strips of the first plurality having planar peaks and troughs positioned at regular intervals, and being positioned parallel to and spaced apart from each other with the peaks and the troughs being in phase with each other such that parallel rows of troughs a known distance apart are formed perpendicular to the first plurality of corrugated strips;

forming a second piece having a second face sheet and a second plurality of corrugated strips fixed to the second face sheet, the corrugated strips of the second plurality having planar peaks and troughs positioned at regular intervals, and being positioned parallel to and spaced said known distance apart from each other with the peaks and troughs being in phase with each other; and fixing the first and second pieces to each other so that the first and second face sheets are parallel to each other, and so that the second plurality of corrugated strips is perpendicular to the first plurality of corrugated strips, the strips of the second plurality being positioned in the rows of troughs formed by the first plurality of corrugated strips.

6. The method of claim 5, wherein the corrugated strips of the second plurality of strips are fixed to the corrugated strips of the first plurality of strips.

7. The method of claim 5, wherein said forming steps both comprise the step of co-curing the face sheets with their respective corrugated strips.

8. The method of claim 7, wherein said forming steps both further comprise the step of using solid mandrels to form the planar peaks and planar troughs of the corrugated strips prior to the co-curing step.

9. The method of claim 8, wherein the solid mandrels are elongate and have an isosceles trapezoidal cross-section.

10. A bi-directionally corrugated sandwich construction made by the method of claim 5.

11. A bi-directionally corrugated sandwich construction made by the method of claim 6.

12. A bi-directionally corrugated sandwich construction made by the method of claim 7.

13. A bi-directionally corrugated sandwich construction made by the method of claim 8.

14. A bi-directionally corrugated sandwich construction made by the method of claim 9.

* * * * *